US012694849B2

(12) United States Patent
Shen et al.

(10) Patent No.: US 12,694,849 B2
(45) Date of Patent: Jul. 28, 2026

(54) PLANE-BASED SCREEN CAPTURE

(71) Applicants:ADVANCED MICRO DEVICES, INC., Santa Clara, CA (US); ATI TECHNOLOGIES ULC, Markham (CA)

(72) Inventors: Yuping Shen, Orlando, FL (US); Min Zhang, Toronto (CA)

(73) Assignees: ADVANCED MICRO DEVICES, INC., Santa Clara, CA (US); ATI TECHNOLOGIES ULC, Markham (CA)

( * ) Notice: Subject to any disclaimer, the term of this patent is extended or adjusted under 35 U.S.C. 154(b) by 402 days.

(21) Appl. No.: 18/080,173

(22) Filed: Dec. 13, 2022

(65) Prior Publication Data

US 2024/0194166 A1    Jun. 13, 2024

(51) Int. Cl.
*G09G 5/14* (2006.01)
*G09G 5/36* (2006.01)
*H04L 67/1095* (2022.01)

(52) U.S. Cl.
CPC .............. *G09G 5/14* (2013.01); *G09G 5/363* (2013.01); *H04L 67/1095* (2013.01); *G09G 2340/12* (2013.01); *G09G 2370/022* (2013.01)

(58) Field of Classification Search
CPC ...... G09G 5/14; G09G 5/363; G09G 2340/12; G09G 2370/022; H04L 67/1095; G06F 3/1454
See application file for complete search history.

(56) References Cited

U.S. PATENT DOCUMENTS

| | | | | |
|---|---|---|---|---|
| 2004/0075619 A1* | 4/2004 | Hansen | ................... | G06F 9/451 |
| | | | | 345/1.1 |
| 2006/0136835 A1* | 6/2006 | Hochmuth | ............... | G09G 5/14 |
| | | | | 715/779 |
| 2013/0152108 A1* | 6/2013 | Jiang | ...................... | G09G 5/363 |
| | | | | 719/321 |
| 2019/0012044 A1* | 1/2019 | Kumar | .................. | G06F 3/0481 |
| 2022/0101814 A1* | 3/2022 | Patel | ...................... | G09G 5/363 |
| 2022/0374585 A1* | 11/2022 | Wang | ................... | G11B 27/031 |
| 2023/0108645 A1* | 4/2023 | Bendapudi | ............... | G06T 1/20 |
| | | | | 375/240.02 |

* cited by examiner

*Primary Examiner* — Xiao M Wu
*Assistant Examiner* — Latrell Anthony Creary

(57) ABSTRACT

A request is received from an application to present content generated by the application in an overlay plane of a multi-plane display system. Responsive to determining that current system resources support presentation of the generated content in the overlay plane, frames of the generated content are displayed in the overlay plane and captured directly from the overlay plane such that the captured frames may be provided to one or more remote client computing systems independently of frames captured from one or more additional overlay planes and from an underlying composited desktop layer. Identifiers of prioritized applications may be maintained based on user preferences to determine specific applications for which generated content is enabled for display via overlay plane.

18 Claims, 4 Drawing Sheets

PLANE-BASED SCREEN CAPTURE

BACKGROUND

The present disclosure relates to the capture and transmission (e.g., streaming) of graphical and/or audiovisual content in cloud computing solutions such as cloud gaming, video streaming, and remote desktop virtualization. In such cloud computing solutions, there are scenarios in which it is desirable to capture and stream multiple windows simultaneously. Previous solutions for the simultaneous capture and stream of multiple windows involve doing so with respect to the entire desktop image, such that all windows are composited by the server into one single-layer image which is captured and streamed.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
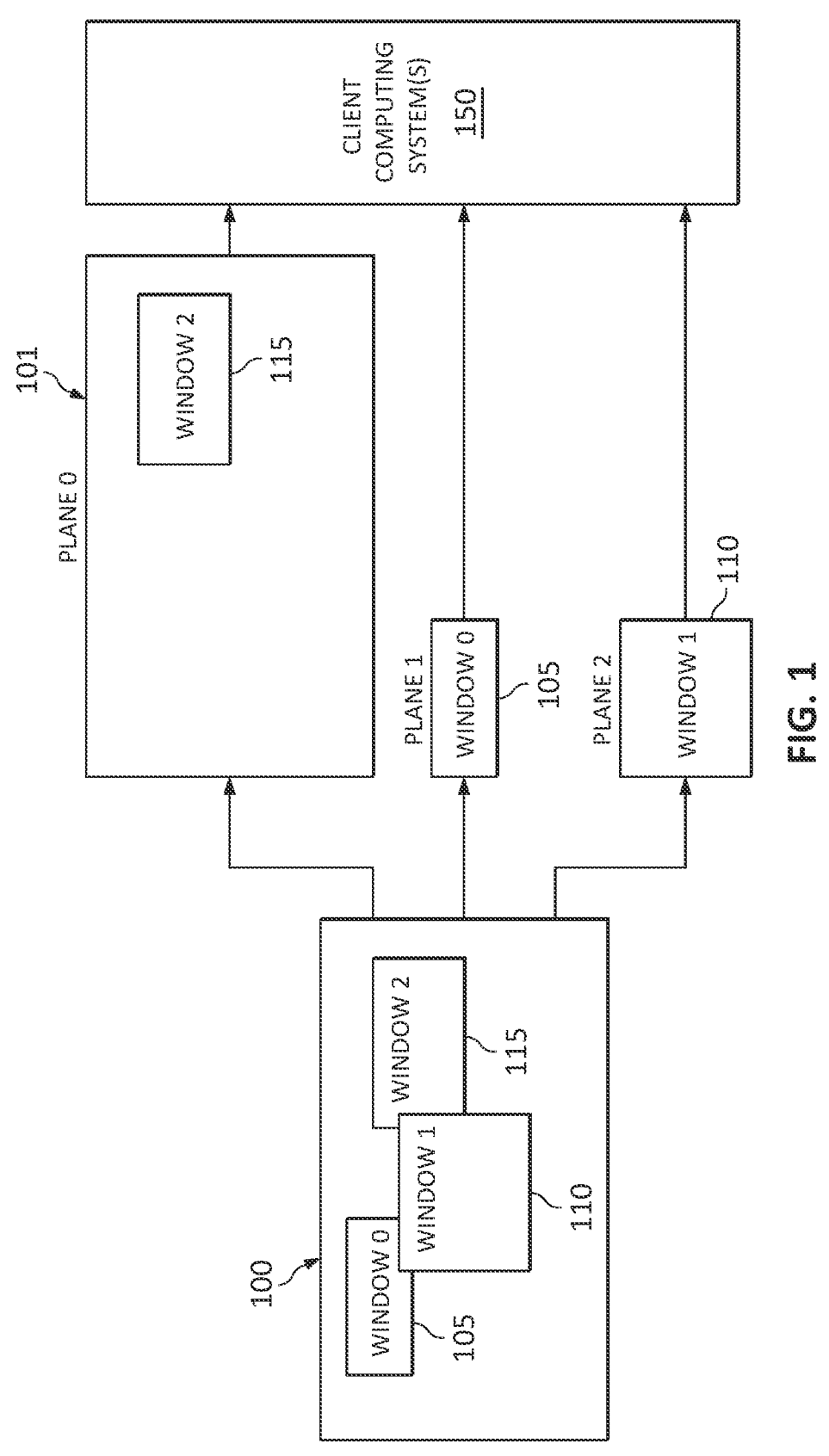
FIG. 1 illustrates various aspects of operations performed by a multi-plane display system in accordance with some embodiments.

As noted above, previous solutions for capturing and streaming multiple windows involve capturing the entire desktop image. In such full-desktop capturing solutions, all windows are composited by the server into one single-layer image that is then transmitted to one or more client computing systems for display. Typical capturing and streaming facilities (e.g., Virtual Network Computing (VNC), Remote Desktop Protocol (RDP), RealVNC, etc.) are based on direct operating system (OS) support (such as via an OS window manager), with that support typically limited to full-desktop capture.

Various disadvantages are associated with these full-desktop capture approaches used by single-plane display systems. For example, each content window is composited by the operating system in accordance with various window parameters (e.g., resolution, coordinates, relative depth, etc.) to form a single composited desktop layer. If more than one content window is to be streamed to a remote client device, a single-plane display system is limited to doing so by capturing and providing to that client device the entirety of that composited desktop layer as a single image. Consequently, although the client device may modify the presentation of the received version of the entire streamed desktop in certain ways (e.g., by modifying the display size or otherwise manipulating the received version in a manner similar to other windows displayed by the client device), it is unable to modify the respective arrangement of individual content windows in any manner. Moreover, in a single-plane display system each of those content windows are limited to being streamed to the client device at a same capture frequency and/or display frequency as the other content windows, as well as that of the underlying desktop layer, as the single-plane display system is unable to provide a subset of the content (such as a window containing rendered video) at a different frame rate than that of the desktop as a whole.

In multiple display-plane systems (multi-plane display systems), the system operating system (OS) and graphics adapter hardware support a multiple-plane overlay mechanism, in which visual contents (including a composited desktop along with individual component content windows) are placed on N separate overlay planes, where Nis an integer (e.g., N=1, 2, 3, . . . ). The number of supported overlay planes depends on operating system and display hardware resources. The contents of each overlay plane are scanned out directly by display hardware or emulated virtual displays, rather than being composited for inclusion in the N=0 desktop layer.

In certain embodiments of a multi-plane display system, a graphics driver controls the display placement of up to N−1 content windows within N−1 overlay planes, such as based on user selection, user preferences, or other criteria. As is discussed in greater detail elsewhere herein, each overlay plane is rendered substantially independently of other overlay planes and of the underlying composited desktop layer, with content windows not placed in an overlay plane being composited into that composited desktop layer.

Embodiments described herein relate to graphics driver-based capturing in a multi-plane display system. Such embodiments support capturing the desktop and individual application windows separately, thereby providing more flexibility when streaming the contents of multiple content windows to one or more remote client computing devices— that is, real-time provision to those client computing devices of frames generated by one or more applications for display in those content windows. In various embodiments, advantages of this approach include an ability to capture and stream individual windows at different frequencies, to rearrange visual contents on the client side differently than that displayed on the server side, to apply digital watermarks to individual windows, etc.

FIG. 1 illustrates various aspects of operations performed by a multi-plane display system (e.g., multi-plane display system 400 of FIG. 4 below) with respect to a graphical desktop 100 in accordance with some embodiments. In the depicted scenario, the graphical desktop 100 includes three content windows 105, 110, 115. For ease of illustration and simplicity, additional elements of the graphical desktop 100 are omitted, but may typically include one or more task bars, system information panels, control elements, or other user interface (UI) elements. In various embodiments, each such additional element may be treated by the OS and/or graphics driver as a separate content window for purposes of desktop layer composition.

As noted elsewhere herein, a single-plane display system is unable to provide a subset of desktop content (such as a content window containing rendered video) at a different frame rate than that of the desktop as a whole. Even in scenarios in which video content is rendered by the server at a relatively high frame rate (e.g., 60 Hz, 120 Hz, 144 Hz), it will be provided to and remotely displayed by the destination client device at a frame rate of the surrounding captured composited desktop, typically around 30 Hz. That is, the frame rate or frequency for the full captured desktop is used for displaying all of the application windows within that captured desktop, disallowing a disparate frame rate for any particular application window. As one example, in certain operating system environments, all windows in the desktop environment are locked to a display frame rate equivalent to that of the vertical synchronization (VSYNC) parameter. Thus, even in scenarios in which the server may allow each of multiple applications to present one or more application windows at different respective frequencies (frame rates), full-desktop capture results in all content generated by all of those multiple applications being provided to a client system at a fixed frequency determined by the OS as part of desktop composition.

In contrast, in embodiments of a multi-plane display system a quantity of overlay planes are available for rendering and displaying content windows independently of the composited desktop layer. In the depicted embodiment of FIG. 1, the multi-plane display system supports N=3 independent overlay planes, such that graphical frames of up to two of the three content windows 105, 110, 115 may be displayed in a respective overlay plane. In the illustrated scenario, frames of content window 105 are displayed in a first overlay plane (Plane 1); frames of content window 110 are displayed in a second overlay plane (Plane 2); and content window 115 is composited by the operating system in accordance with various window parameters (e.g., resolution, coordinates, relative depth, etc.) to form a single composited desktop layer 101 (Plane 0).

In embodiments, the graphics driver of the multi-plane display system not only supports the independent rendering and display of content windows in multiple (N−1) overlay planes, it further supports independent capturing of each such overlay plane. In this manner, frames of content windows 105, 110 are captured independently of each other and independently of frames of the composited desktop layer 101, and are streamed in a similar independent manner to one or more destination client computing systems 150. Thus, captured frames of a composited desktop layer are provided to the client computing systems 150 substantially simultaneously with the captured frames of the generated content of content windows 105, 110 to the one or more remote client computing systems.

In certain embodiments, the graphics driver captures frames of the generated content from the overlay plane at one frequency (typically a relatively high frequency, e.g., 60 Hz, 120 Hz, 144 Hz), and captures frames of the composited desktop layer at a different frequency (e.g., 30 Hz). Similarly, with respect to streaming such captured frames to the client computing system(s) 150, the graphics driver provides the frames from the overlay plane at the first (typically higher) frequency, and provides the frames of the composited desktop layer at the second (typically lower) frequency.

Because the overlay planes displaying content windows 105, 110 are captured independently from one another and independently from the composited desktop layer 101, the multi-plane display system provides (streams) the captured frames from those respective sources in a manner that allows client-side rearrangement. That is, each of the remote client computing system(s) 150 is thereby enabled to rearrange the respective positions of content windows 105, 110 and composited desktop layer 101 differently than the respective arrangement in which they are displayed by the multi-plane display system as graphical desktop 100.

In various embodiments and scenarios, the independent display and capture of content windows 105, 110 and composited desktop layer 101 includes utilizing independent sets of display parameters for those content windows 105, 110 and composited desktop layer 101. For example, in certain embodiments the multi-plane display system presents the composited desktop layer 101 in a manner limited by a vertical synchronization (VSYNC) display parameter, such that the frame rate of the composited desktop layer is limited to that of a refresh rate associated with a physical or virtualized display device attached to the multi-plane display system (i.e., VSYNC on), while displaying the frames of content window 110 without such limitations (i.e., VSYNC off). As non-limiting examples, additional display parameters that may be established independently for each overlay plane include an effective resolution, color depth, frame rate, display frequency, memory layout, video format, image format, and encoding/decoding parameters.

In certain embodiments, a user may specify one or more applications (or application types) from which content is prioritized to be placed in an overlay plane rather than on an underlying composited desktop layer. The multi-plane display system may therefore determine (such as via a graphics driver, e.g., graphics driver 425 of FIG. 4 below) which of content windows 105, 110, 115 to display in an overlay plane based at least in part on one or more user preferences associated with a particular application respectively generating content for each of those content windows 105, 110, 115. For example, in some embodiments the multi-plane display system maintains a set of user preferences accessible by the graphics driver and associates one or more applications with prioritized content to be displayed in one or more overlay planes when possible. Such user preferences may be provided via user interactions (e.g., with the multi-plane display system and/or with one of client computing system(s) 150) to indicate that an application is associated with prioritized content or is an application of a prioritized type (e.g., a video player, gaming application, etc.). In some embodiments, each application prioritized in this manner may be identified by a unique identifier in a listing maintained by the operating system or by the graphics driver. For example, the identifier may be a name of an executable program used to initiate the application, a window handle, streaming session identifier, etc.

A swap chain is a collection of real or virtualized frame buffers that are used for displaying graphical frames to a user. Each time an application presents a new frame for display, the next frame buffer in the swap chain takes the place of the currently displayed frame buffer. In certain embodiments, responsive to an application creating a swap chain for the presentation of content, and/or responsive to an OS query of the graphics driver regarding availability and support for one or more overlay planes, the graphics driver queries the maintained set of user preferences to determine if the requesting application is prioritized for overlay plane placement. If so, and if current system resources support presentation of the generated content in the overlay plane, frames of the generated content are displayed via the overlay plane. In certain embodiments, if a number of active prioritized applications exceeds OS or hardware limitations, the graphics driver reports that the request is unsupported, in which case the content generated by the requesting application will instead be displayed as part of an underlying composited desktop layer.

Figure 2:
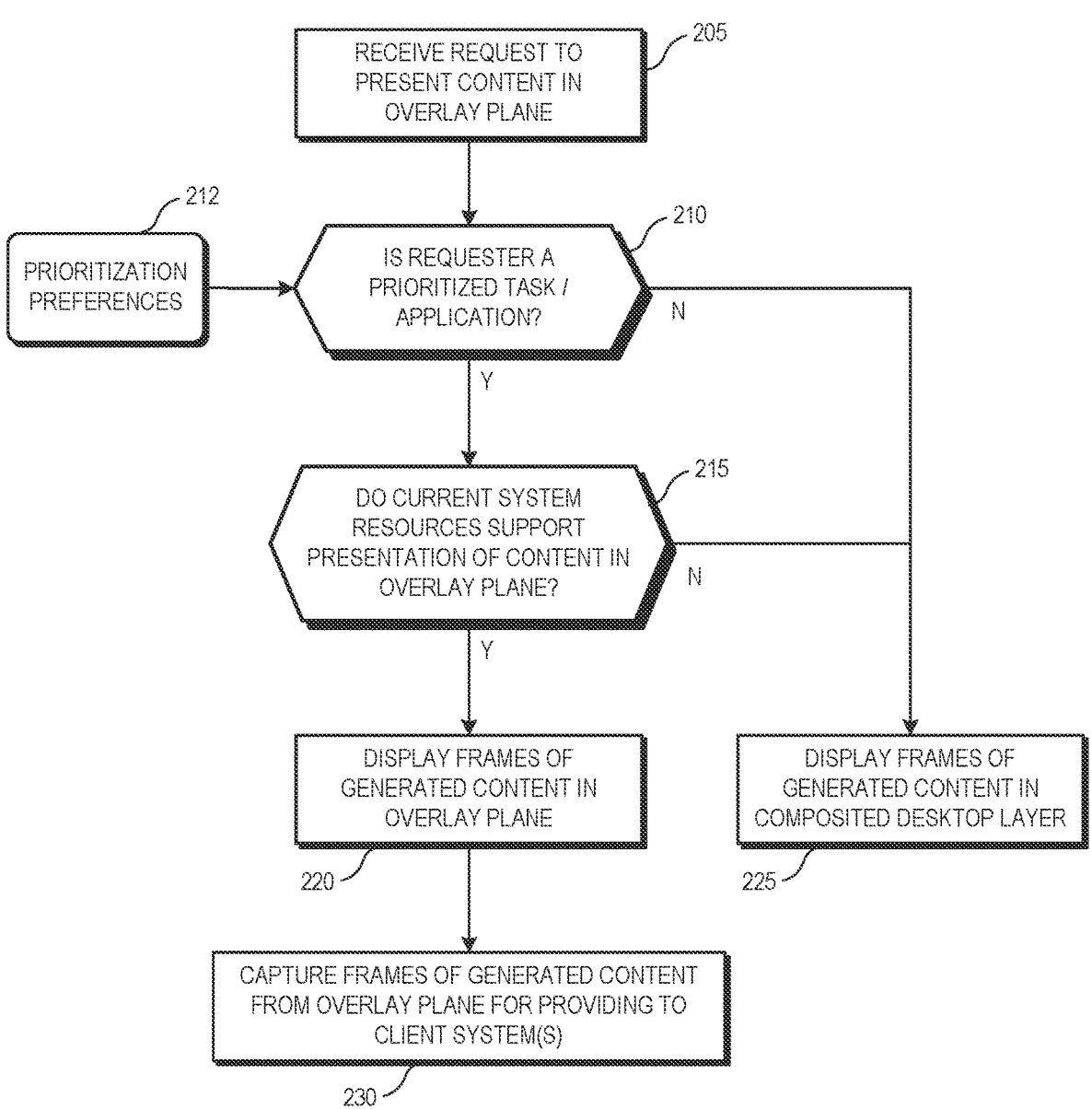
FIG. 2 partially illustrates combined operations of elements of a multi-plane display system in accordance with some embodiments.

FIG. 2 is a flow diagram illustrating an example of an operational routine for performance by a multi-plane display system (such as multi-plane display system 400 of FIG. 4, described below).

The routine begins at block 205, in which a graphics driver of the multi-plane display system receives a request from an application to present content generated by the application in an overlay plane. In some embodiments, the request can take the form of a swap chain notification, in which the application informs a processor (such as hardware processor 402 of FIG. 4) and/or OS of the multi-plane display system that the application has created a swap chain for the presentation of content. In such embodiments, the processor issues a notification of the new swap chain to the graphics driver, which determines whether to place the generated content in an overlay plane if supported, or otherwise places the generated content as part of the underlying desktop composition layer. In other embodiments, the request can take the form of an application startup notification issued by the processor to the graphics driver. After receiving the request (either as an explicit request or runtime notification), the routine proceeds to block 210.

At block 210, the routine determines whether the requesting application is a prioritized task or application based on a set of prioritization preferences 212, which includes a maintained listing of identifiers associated with prioritized applications or tasks. In certain embodiments, the graphics driver accesses the prioritization preferences 212 to compare an identifier of the content-generating application with the stored prioritization preferences to determine whether the task or application has been prioritized for displaying content generated by that task or application in an overlay plane rather than the underlying composited desktop. In certain embodiments, when initiating an application (or, in some embodiments, when an application first creates a display swap chain for rendering) the graphics driver may check the prioritization listing to determine whether the application is included.

If it is determined in block 210 that the requesting application is a prioritized application, the routine proceeds to block 215.

At block 215, the routine determines whether current resources (such as a quantity of overlay planes supported by the graphical hardware, and a quantity of overlay planes currently in use) permit the requesting application's generated content to be displayed via its own overlay plane. In certain embodiments, a multi-plane display system supports a quantity of overlay planes between 1 and 16. In certain embodiments, the determination includes the OS querying the graphics driver to determine whether the overlay plane request is currently supported; in other embodiments, the graphics driver may autonomously make the determination, such as in direct response to the determination in block 210 that the requesting application is prioritized.

If it is determined in block 215 that current system resources support presentation of the content generated by the requesting application in an overlay plane, the routine proceeds to block 220 and displays frames of the content generated by the requesting application in its own overlay plane. In certain embodiments, the display of the generated content may further include specification and/or negotiation by the streaming application 315 of various display parameters relating to the content to be displayed in the requested overlay plane. As non-limiting examples, such display parameters may include one or more of an effective resolution, color depth, frame rate and/or frame rate limiting parameters (e.g., VSYNC), display frequency, memory layout, video format, image format, and encoding/decoding parameters. The routine proceeds to block 230.

At block 230, frames of the content generated by the requesting application are captured directly from the overlay plane for providing to one or more remote client computing systems. In certain embodiments, providing the captured frames of the generated content to the remote client computing system(s) is typically performed substantially simultaneously with providing captured frames of an underlying composited desktop layer. However, because the captured frames from the overlay plane are provided independently from those of the composited desktop layer, flexibility associated with the corresponding streamed content received by the client computing system is significantly increased, as discussed above.

If it was determined in block 210 that the requesting application is not a prioritized application, or determined in block 215 that current system resources do not support presentation of content in an overlay plane, the routine proceeds to block 225, in which frames of content generated by the requesting application are displayed in a composited desktop layer.

Figure 3:
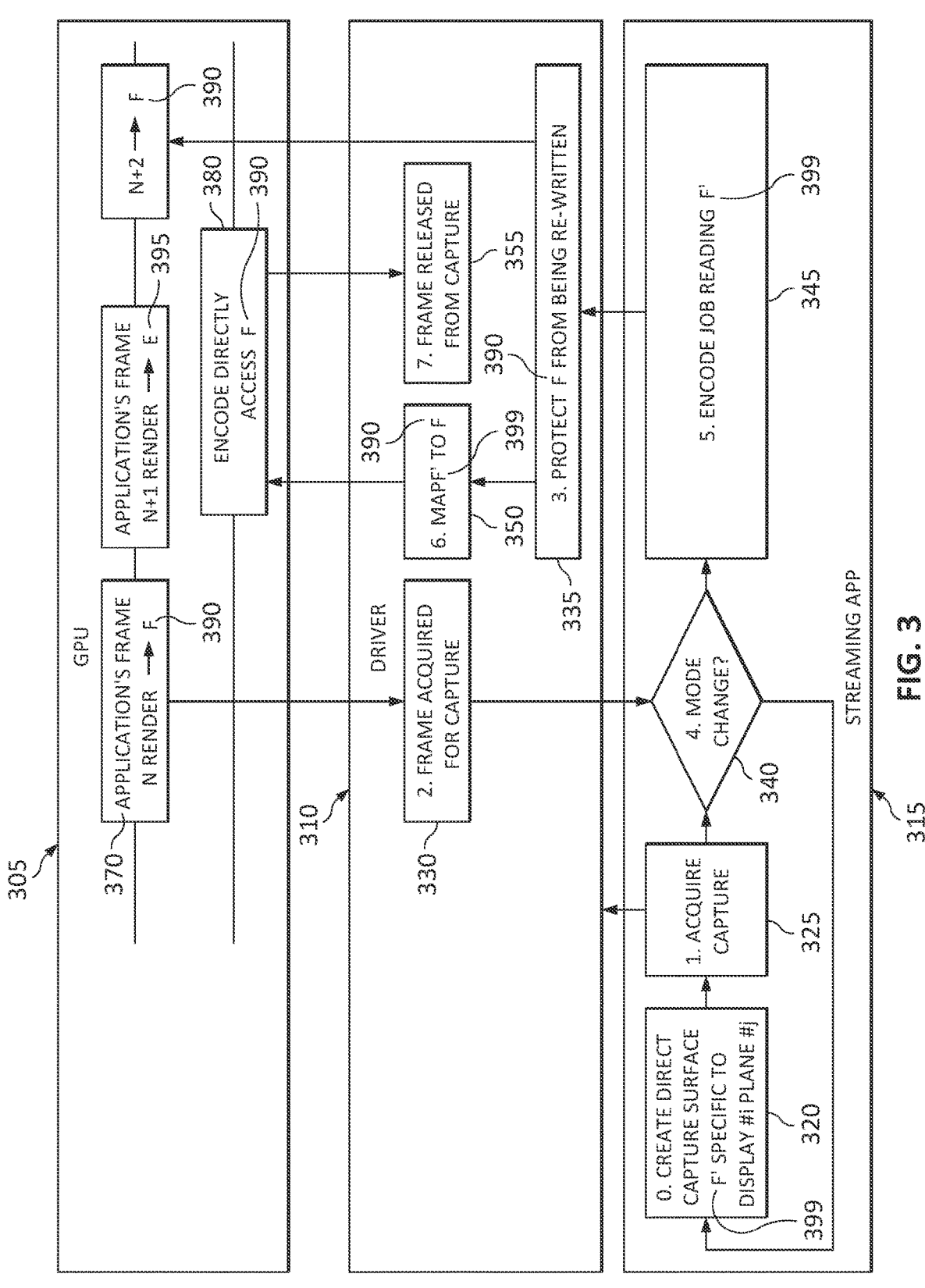
FIG. 3 is an operational flow diagram illustrating an example of a routine for performance by a multi-plane display system suitable for implementing one or more embodiments.

FIG. 3 partially illustrates combined operations of elements in a multi-plane display system (e.g., multi-plane display system 400 of FIG. 4 below) in accordance with some embodiments. In particular, FIG. 3 illustrates operations of a graphics processing unit (GPU) 305 (e.g., graphics processor 406 of FIG. 4), a graphics driver 310 (e.g., graphics driver 425 of FIG. 4), and a streaming application 315 (which may be included as some or all of instructions 424 executing in main memory 404, also as described below with respect to FIG. 4) as those elements perform various operations to capture a Frame N of a content window (e.g., one of content windows 105, 110, 115 of FIG. 1) generated by the streaming application 315.

The combined operations begin at block 320, in which the streaming application 315 and the graphics driver 310 create a direct capture surface 399 (F'), which is used to access frame data displayed via a specific overlay plane. In the depicted embodiment, the direct capture surface 399 is accompanied by an indication of the particular display ("i", of an unspecified number of real or virtual displays communicatively coupled to the multi-plane display system) and overlay plane ("j", of an unspecified number of supported overlay planes) from which the displayed contents generated by streaming application 315 are to be captured. As described elsewhere herein, in certain embodiments the creation of the direct capture surface 399 may follow various negotiations between the streaming application 315 and the graphics driver 310 to verify that current system resources support creation of the overlay plane j for display of the streaming application's generated content, and/or to verify that the streaming application 315 is a prioritized application for such display (based, for example, on user preferences) prior to the creation of the direct capture surface 399 by which frames displayed by the streaming application 315 are to be captured.

The combined operations continue at block 325, in which the streaming application 315 requests that the graphics driver 310 initiate a capture operation with respect to Frame N (the next available frame for display), which at block 370 is rendered into a frame buffer 390 (F) by the GPU 305. In the depicted embodiment, Frame N is the next frame for display in a two-buffer swap chain associated with the streaming application 315 and implemented by the GPU 305. The swap chain includes the frame buffer 390 and also a frame buffer 395 (E).

The combined operations continue at block 330, in which the generated Frame N is displayed by the graphics driver 310 and becomes available for capture, and then to block 340, in which the streaming application 315 checks to determine whether there has been a display mode change (e.g., a change to one or more of resolution, format, memory data layout, frequency, etc.). When a direct capture surface (e.g., direct capture surface 399) is created, parameters for that direct capture surface are determined based on corresponding display parameters associated with the displayed content to be captured. If there is a display mode change after the creation of that direct capture surface—indicating that the next available frame's surface (e.g., direct capture surface 390, discussed below with respect to block 350) is associated with different parameters—then the previously created direct capture surface is not suitable for capturing the new frames, and may therefore be newly instantiated. If so, the combined operations return to block 320 to create or otherwise instantiate a new direct capture surface 399 (such as with one or more new display parameters).

If it was determined in block 340 that no display mode change has occurred, the combined operations proceed to block 345, in which the streaming application 315 initiates encoding of the contents (currently displayed Frame N) of the direct capture surface 399.

The combined operations proceed to block 335, in which the graphics driver 310 initiates temporarily preventing the contents of frame buffer 390 from being overwritten during the capture and encoding process.

The combined operations proceed to block 350, in which the graphics driver 310 maps the direct capture surface 399 to the frame buffer 390 before the combined operations proceed to block 380, in which the GPU 305 encodes the frame buffer 390 for streaming out to one or more client devices.

Following the encoding by GPU 305 of the frame buffer 390, combined operations proceed to block 355, in which the graphics driver 310 releases Frame N from capture (indicating that the streaming application 315 has completed operations with respect to Frame N) and ends the temporary overwrite protection for frame buffer 390 that was initiated in block 335 as part of beginning to encode the contents of the direct capture surface 399.

It will be appreciated that in various embodiments, some or all of the combined operations described above with respect to Frame N may be substantially re-created with respect to subsequent Frames N+1, N+2, . . . , etc.

Figure 4:
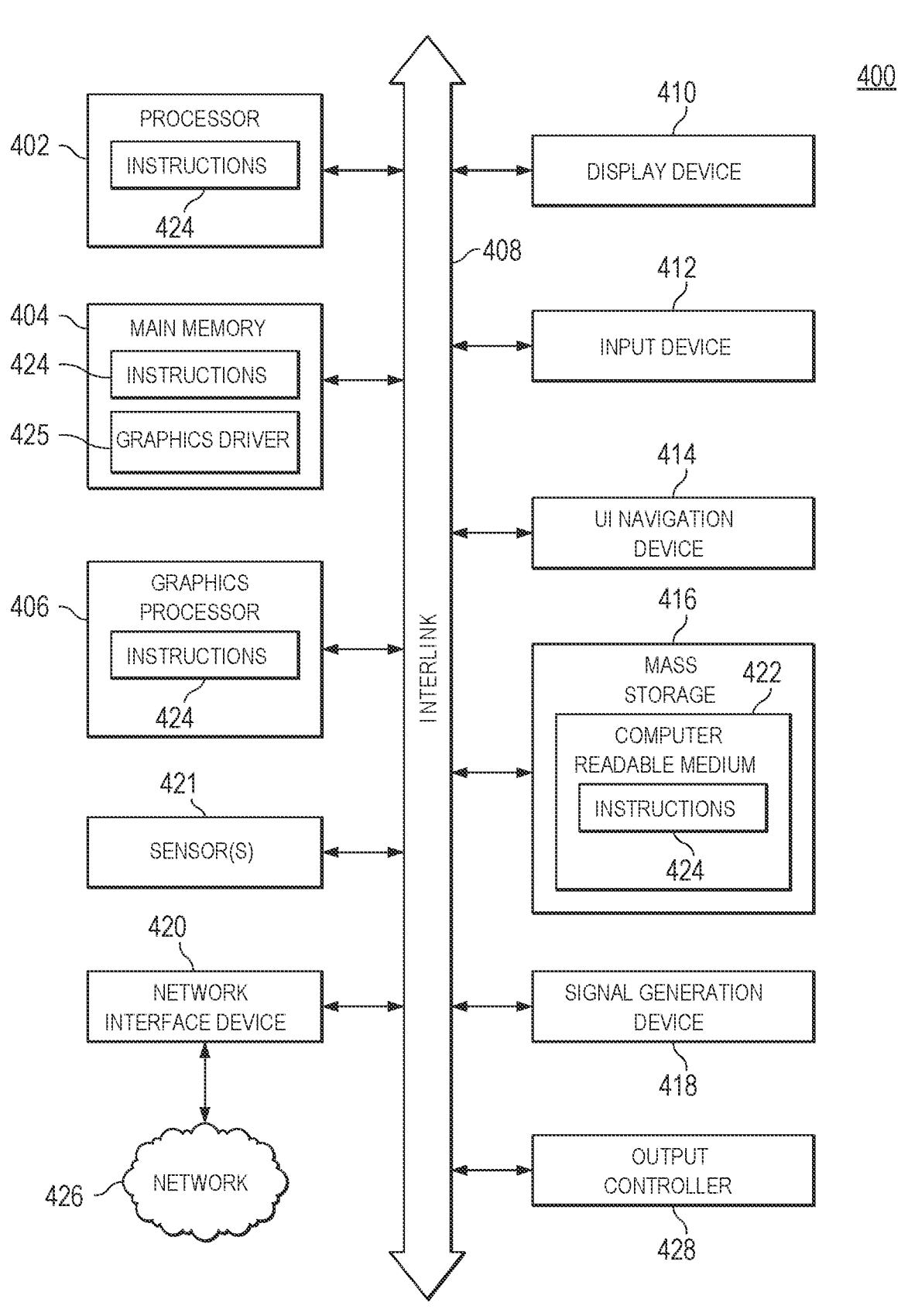
FIG. 4 is a component-level block diagram illustrating an example of a multi-plane display system suitable for implementing one or more embodiments.

FIG. 4 is a component-level block diagram illustrating an example of a multi-plane display system 400 suitable for implementing one or more embodiments. In alternative embodiments, the multi-plane display system 400 may operate as a standalone device or may be connected (e.g., networked) to other systems. In various embodiments, one or more components of the multi-plane display system 400 each comprise a collection of circuitry that, when in combined operation, perform various operations of the multi-plane display system 400 as described herein. In some embodiments, one or more components of the multi-plane display system 400 are incorporated as or within one or more server computing systems to provide, as one non-limiting example, graphics rendering for display to one or more users via one or more remote client computing devices. It will be appreciated that such an associated client computing device may include some components of the multi-plane display system 400, but not necessarily all of them. In a networked deployment, the multi-plane display system 400 may operate in the capacity of a server machine, a client machine, or both in server-client network environments. In at least one example, the multi-plane display system 400 may act as a peer system in peer-to-peer (P2P) (or other distributed) network environment. The multi-plane display system 400 may therefore operate in certain embodiments as a server computer, a personal computer (PC), a tablet PC, a set-top box (STB), a mobile computing device, a web appliance, a network router, switch or bridge, or any system capable of executing instructions (sequential or otherwise) that specify actions to be taken by that system. Further, while only a single system is illustrated, the term "system" shall also be taken to include any collection of systems that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components or mechanisms. Circuitry is a collection of circuits implemented in tangible entities that include hardware (e.g., simple circuits, gates, logic, etc.). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer-readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time.

The multi-plane display system 400 includes one or more hardware processors 402 (e.g., a central processing unit (CPU), a hardware processor core, or any combination thereof), a main memory 404, and a graphics processing unit (GPU) 406, some or all of which may communicate with each other via an interlink (e.g., bus) 408. In the depicted embodiment, a graphics driver 425 (which is operationally analogous to graphics driver 310 of FIG. 3) is executing within the main memory 404, such as to interface with the GPU 406 to implement performance of various operations described herein.

The multi-plane display system 400 further includes a display unit 410 (such as a display monitor or other display device), an input device 412 (e.g., a keyboard or other physical or touch-based actuators), and a user interface (UI) navigation device 414 (e.g., a mouse or other pointing device, such as a touch-based interface). In one example, the display unit 410, input device 412, and UI navigation device 414 may include a touch screen display. The multi-plane display system 400 may additionally include a storage device (e.g., drive unit) 416, a signal generation device 418 (e.g., a speaker), a network interface device 420, and one or more sensors 421, such as a global positioning system (GPS) sensor, compass, accelerometer, or other sensor. The multi-plane display system 400 may include an output controller 428, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 416 may include a computer-readable medium 422 on which is stored one or more sets of data structures or instructions 424 (e.g., software) embodying or utilized by any one or more of the techniques or functions described herein. The instructions 424 may also reside, completely or at least partially, within the main memory 404, within GPU 406, or within the hardware processor 402 during execution thereof by the multi-plane display system 400. In an example, one or any combination of the hardware processor 402, the main memory 404, the GPU 406, or the storage device 416 may constitute computer-readable media.

While the computer-readable medium 422 is illustrated as a single medium, the term "computer-readable medium" may include a single medium or multiple media (e.g., a centralized or distributed database, and/or associated caches and servers) configured to store the one or more instructions 424.

The term "computer-readable medium" may include any medium that is capable of storing, encoding, or carrying instructions for execution by the multi-plane display system 400 and that cause the multi-plane display system 400 to perform any one or more of the techniques of the present disclosure, or that is capable of storing, encoding or carrying data structures used by or associated with such instructions. Non-limiting computer-readable medium examples may include solid-state memories, and optical and magnetic media. In an example, a massed computer-readable medium includes a computer-readable medium with a plurality of particles having invariant (e.g., rest) mass. Accordingly, massed computer-readable media are not transitory propagating signals. Specific examples of massed computer-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 424 may further be transmitted or received over a communications network 426 using a transmission medium via the network interface device 420 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 420 may include one or more physical jacks (e.g., Ethernet, coaxial, or phone jacks) or one or more antennas to connect to the communications network 426. In an example, the network interface device 420 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the multi-plane display system 400, and includes digital or analog communications signals or other intangible medium to facilitate communication of such software.

In some embodiments, the apparatus and techniques described above are implemented in a system including one or more integrated circuit (IC) devices (also referred to as integrated circuit packages or microchips). Electronic design automation (EDA) and computer aided design (CAD) software tools may be used in the design and fabrication of these IC devices. These design tools typically are represented as one or more software programs. The one or more software programs include code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disk, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
receiving a request from a first application to present content generated by the first application in an overlay plane of a multi-plane display system;
responsive to the request, displaying frames of the generated content in the overlay plane; and
capturing from the overlay plane at a first frequency the frames of the generated content for providing the captured frames to one or more remote client computing systems, and capturing frames of a composited desktop layer at a second frequency that is different from the first frequency.

2. The method of claim 1, comprising providing to the one or more remote client computing systems the captured frames of the composited desktop layer substantially simultaneously with the captured frames of the generated content.

3. The method of claim 1, comprising providing the frames of the generated content from the overlay plane at the first frequency, and providing the frames of the composited desktop layer at the second frequency.

4. The method of claim 1, further comprising displaying the composited desktop layer and the overlay plane in a first respective arrangement in the multi-plane display system, wherein providing the captured frames of the composited desktop layer substantially simultaneously with providing the captured frames of the generated content includes providing the captured frames of the composited desktop layer and the captured frames of the generated content at the overlay plane for display by the one or more remote client computing systems in a second respective arrangement that is different from the first respective arrangement.

5. The method of claim 1, wherein displaying the composited desktop layer includes displaying the composited desktop layer in accordance with a first vertical synchronization (VSYNC) parameter, and wherein displaying frames of the generated content in the overlay plane includes displaying the frames of the generated content in accordance with a second VSYNC parameter that is different than the first VSYNC parameter.

6. The method of claim 1, further comprising determining whether to display the generated content in the overlay plane based at least in part on one or more user preferences associated with the first application.

7. The method of claim 6, further comprising maintaining a set of user application preferences associating one or more applications with prioritized content to be displayed in one or more overlay planes.

8. The method of claim 1, wherein capturing the frames of the generated content from the overlay plane is performed by a graphics driver of the multi-plane display system.

9. The method of claim 1, further comprising:
capturing, substantially simultaneously with capturing of the frames of the content generated by the first application, frames of second content generated by a second application and displayed in a distinct second overlay plane; and
providing the captured frames of second content to at least one of the one or more remote client computing systems.

10. A multi-plane display system, comprising:
one or more processors; and
a graphics driver configured to:
receive a request from a first application to present content generated by the first application in an overlay plane of a multi-plane display system;
responsive to the request, display frames of the generated content in the overlay plane; and
capture the frames of the generated content from the overlay plane at a first frequency to provide the captured frames to one or more remote client computing systems, and capture frames of a composited desktop layer at a second frequency that is different from the first frequency.

11. The multi-plane display system of claim 10, further comprising providing the captured frames of the composited desktop layer substantially simultaneously with the captured frames of the content generated by the first application.

12. The multi-plane display system of claim 10, wherein the graphics driver is further configured to provide the frames of the generated content from the overlay plane at the first frequency, and to provide the frames of the composited desktop layer at the second frequency.

13. The multi-plane display system of claim 10, wherein the composited desktop layer and the overlay plane are displayed in a first respective arrangement in the multi-plane display system, and wherein the graphics driver is configured to provide the captured frames of the composited desktop layer substantially simultaneously with the captured frames of the generated content for display by the one or more remote client computing systems in a second respective arrangement that is different from the first respective arrangement.

14. The multi-plane display system of claim 10, wherein frames of the composited desktop layer are captured in accordance with a first vertical synchronization (VSYNC) parameter, and wherein frames of the generated content in the overlay plane are captured in accordance with a second VSYNC parameter that is different than the first VSYNC parameter.

15. The multi-plane display system of claim 10, wherein the graphics driver is further configured to determine whether to display the generated content in the overlay plane based at least in part on one or more user preferences associated with the first application.

16. The multi-plane display system of claim 15, further comprising a maintained set of user application preferences, wherein the maintained set associates one or more applications with prioritized content to be displayed in one or more overlay planes.

17. The multi-plane display system of claim 10, wherein the graphics driver is further configured to capture, substantially simultaneously with capture of the frames of the content generated by the first application, frames of second content generated by a second application and displayed in a distinct second overlay plane.

18. A method performed by a client computing device, the method comprising:

receiving, from a remote server computing system, one or more desktop frames of a composited desktop layer captured at a first frequency;

receiving, from the remote server computing system, one or more frames of application content generated by a first application, the one or more frames of application content captured at a second frequency that is different than the first frequency and from an overlay plane positioned in a first respective arrangement with respect to the one or more desktop frames of the composited desktop layer; and displaying the one or more desktop frames of the composited desktop layer and the one or more frames of application content generated by the first application in a second respective arrangement that is different than the first respective arrangement.

* * * * *